(12) United States Patent
Koch

(10) Patent No.: US 8,228,103 B2
(45) Date of Patent: Jul. 24, 2012

(54) CIRCUIT BREAKER

(75) Inventor: Michael Koch, Vienna (AT)

(73) Assignee: Moeller Gebäudeautomation GmbH, Schrems (AT)

( * ) Notice: Subject to any disclaimer, the term of this patent is extended or adjusted under 35 U.S.C. 154(b) by 297 days.

(21) Appl. No.: 12/710,690

(22) Filed: Feb. 23, 2010

(65) Prior Publication Data
US 2010/0213996 A1 Aug. 26, 2010

Related U.S. Application Data

(60) Provisional application No. 61/154,547, filed on Feb. 23, 2009.

(30) Foreign Application Priority Data

Feb. 23, 2009 (AT) .................................. A 296/2009

(51) Int. Cl.
G05F 1/10 (2006.01)
(52) U.S. Cl. ........................................ 327/164; 324/536
(58) Field of Classification Search .................. None
See application file for complete search history.

(56) References Cited

U.S. PATENT DOCUMENTS

| | | | |
|---|---|---|---|
| 5,839,092 A | 11/1998 | Erger | |
| 7,227,729 B2 * | 6/2007 | Parker et al. | 361/42 |
| 7,400,481 B2 | 7/2008 | Pellon | |
| 7,535,234 B2 * | 5/2009 | Mernyk et al. | 324/536 |
| 7,925,458 B2 * | 4/2011 | Kolker et al. | 702/59 |
| 2004/0066593 A1 | 4/2004 | Kolker | |
| 2007/0252603 A1 * | 11/2007 | Restrepo et al. | 324/536 |

FOREIGN PATENT DOCUMENTS
CA 1287884 8/1991
* cited by examiner

*Primary Examiner* — Cassandra Cox
(74) *Attorney, Agent, or Firm* — Henry M. Feiereisen; Ursula B. Day; Stefan Knirr

(57) ABSTRACT

A circuit breaker having break contacts for disconnecting an electric grid or network in a predetermined manner includes a trigger unit which triggers actuation of the break contacts in response to signals received from a detector which detects aperiodic, substantially step-like changes in the amplitude of at least one electric parameter in the electric network. The trigger unit is operatively connected with the detector. The disclosed circuit breaker reduces the likelihood of a fire caused by faults in electric networks.

20 Claims, 7 Drawing Sheets

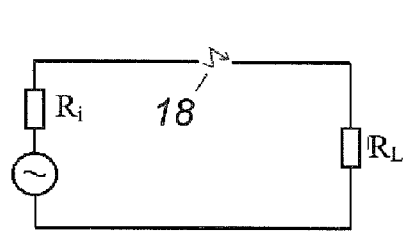
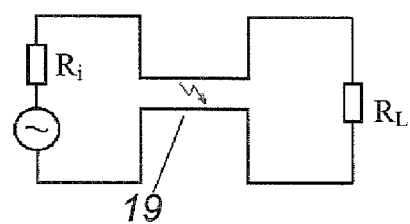
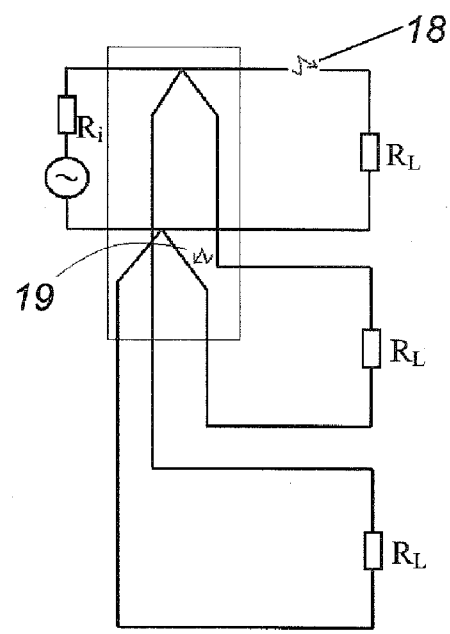
Fig. 1    Fig. 2
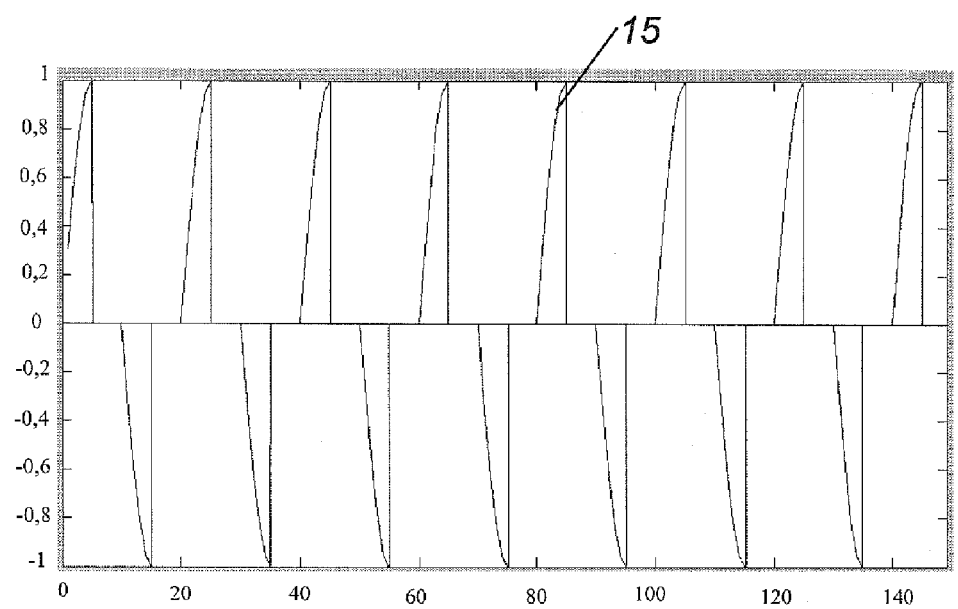
Fig. 3

CIRCUIT BREAKER

CROSS-REFERENCES TO RELATED APPLICATIONS

This application claims the priority of Austrian Patent Application, Serial No. A 296/2009, filed Feb. 23, 2009, pursuant to 35 U.S.C. 119(a)-(d), the content of which is incorporated herein by reference in its entirety as if fully set forth herein.

This application claims the benefit of prior filed U.S. provisional Application No. 61/154,547, filed Feb. 23, 2009, pursuant to 35 U.S.C. 119(e), the content of which is incorporated herein by reference in its entirety as if fully set forth herein.

BACKGROUND OF THE INVENTION

The present invention relates to a circuit breaker.

Conventional circuit breakers disconnect an electric grid or network, a partial network or an electric line by automatically opening break contacts in the event of increased current flow in the electric network or electric line. Other types of conventional circuit breakers disconnect a network, a partial network or an electric line by automatically opening break contacts if a residual current is present.

These conventional circuit breakers disadvantageously may fail to detect other sources of errors in electric networks or lines, besides those described above, which can represent a potential hazard for installations and living beings, especially by causing a fire, and which cannot be safely detected by the aforedescribed conventional circuit breakers, because an increased current flow or a residual current may not occur. The aforedescribed conventional circuit breakers are not capable of recognizing faults which do not cause increased current flow in a line or a residual current, although such faults can still lead to a fire in or near an electric network.

It would therefore be desirable to provide a circuit breaker of the aforedescribed type which obviates the aforementioned disadvantages and reduces the likelihood of a fire caused by faults in electric networks.

SUMMARY OF THE INVENTION

According to one aspect of the present invention, a method for detecting aperiodic, substantially step-like changes in amplitude of at least one electric parameter, especially the current and/or the voltage, in an electric network, includes the steps of measuring a temporal progression of the at least one electric parameter to form a first parameter signal faithfully representing the temporal progression, assigning for a duration of the first parameter signal a predetermined constant positive first value to each positive component of the first parameter signal and assigning a predetermined constant negative second value to each negative component of the first parameter signal, and forming a first rectangular signal. The method further includes the steps of detecting rising or falling flanks of the first rectangular signal and assigning a predetermined third value unequal zero to regions between two consecutive rising flanks or two consecutive falling flanks, and assigning a value of zero to regions disposed between a rising flank and a falling flank, thereby forming a second rectangular signal. And further determining a first pulse-duty factor of the second rectangular signal, comparing the first pulse-duty factor with a pulse-duty factor of 1:1, and signaling detection of an aperiodic, substantially step-like change in the amplitude of the at least one electric parameter if the first pulse-duty factor is different from the pulse-duty factor of 1:1.

According to another aspect of the invention, a detector for detecting aperiodic, substantially step-like changes in amplitude of at least one electric parameter, especially the current and/or the voltage, in an electric network, includes a sensor configured to measure a temporal progression of at least one electric parameter, a first unit having an input connected to the sensor and receiving a signal from the sensor, and an output supplying a mathematical sign function, a flank detector having an input connected to the output of the first unit and determining a flank of the mathematical sign function as output signal, a second unit having an input receiving the output signal from the flank detector and determining a pulse-duty factor of a rectangular function, and an output unit connected to an output of the second unit.

According to yet another aspect of the invention, a circuit breaker includes a break contacts for disconnecting an electric network, at least one trigger unit configured to trigger the break contact, and a detector of the aforedescribed type according to the invention.

The likelihood of a fire caused by faults in electric networks can thus be reduced. So-called serial and/or parallel faults which can lead to arcing can thus be recognized in an electric network and the respective network can be disabled or disconnected, thereby reliably preventing a fire which may be produced, for example, by arcing. Living beings and installations can thus be protected from the hazards of electric current and a resulting fire.

Embodiments of the invention may include one or more of the following features.

In one embodiment, the predetermined constant positive first value and the predetermined constant negative second value may be assigned to two temporally consecutive, substantially step-like changes which have greater amplitude than the first parameter signal before the substantially step-like change. The first value and the second value may have identical magnitude.

In another embodiment, the second rectangular signal may be transformed from a time domain into an image domain, for example the frequency domain, to determine even-numbered harmonics of the fundamental frequency. The first pulse-duty factor of the second rectangular signal may be determined from a predetermined fraction of even-numbered harmonics of a fundamental frequency. The even-numbered harmonics may also be determined by filtering the second rectangular signal with a filter arrangement, where filter constants of the filter arrangement may be matched to the fundamental frequency. The filter arrangement may include a band-pass filter and/or a comb filter.

In yet another embodiment, a third rectangular signal may be formed by adding to or subtracting from the second rectangular signal a signal having half a magnitude of the third value, and the absence of an offset in the third rectangular signal may be determined.

The first parameter signal, which may be a temporally non-periodic signal, may be intermediately stored for a predetermined time period.

BRIEF DESCRIPTION OF THE DRAWING

Other features and advantages of the present invention will be more readily apparent upon reading the following description of currently preferred exemplified embodiments of the invention with reference to the accompanying drawing, in which FIG. 1 shows two schematic circuit diagrams for illustrating a serial and a parallel fault in an electric network;

FIG. 2 shows a schematic circuit diagram for illustrating a combined serial and parallel fault in a triple distributor;

FIG. 3 shows a first example of a first parameter signal (current signal) with periodic step-like changes in the amplitude of an electric parameter as a result of a serial fault in the time domain;

DETAILED DESCRIPTION OF PREFERRED EMBODIMENTS

Figure 4:
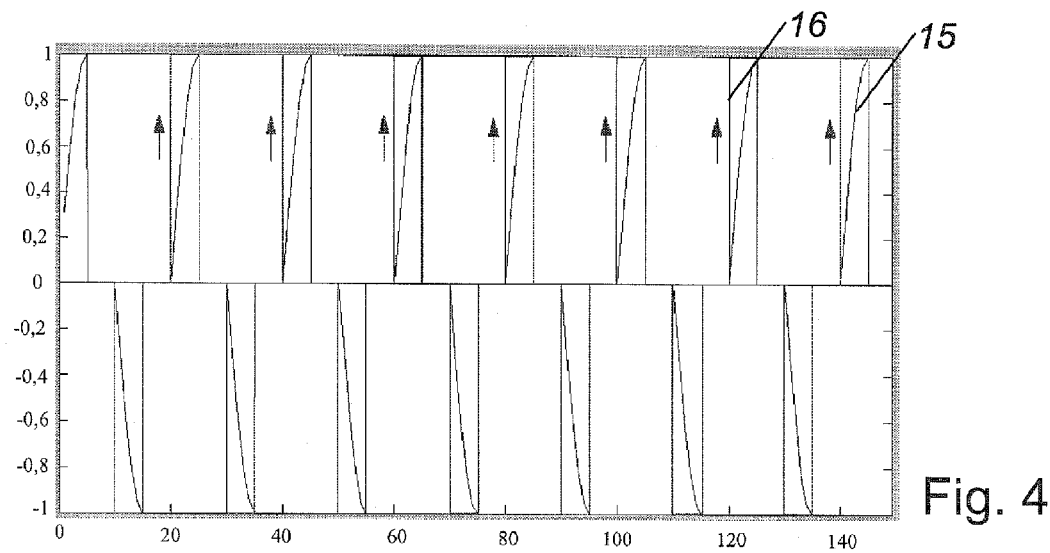
FIG. 4 shows the parameter signal according to FIG. 3 after the first step of the inventive method in the time domain.

Throughout the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 17:
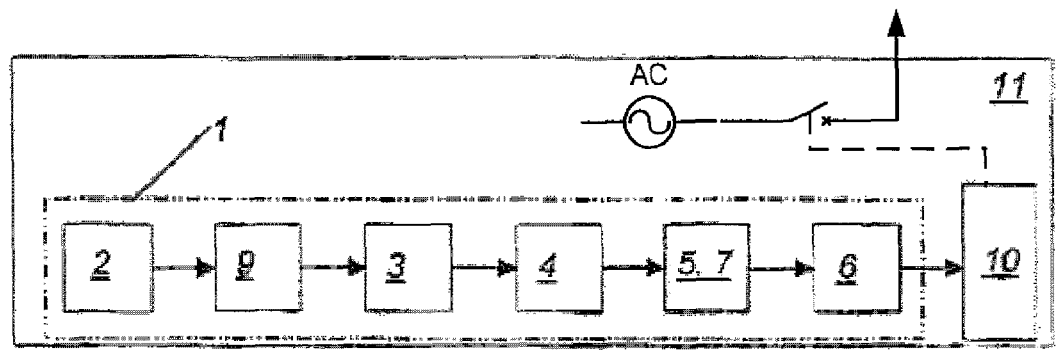
FIG. 17 shows a block diagram of a preferred embodiment of a circuit breaker with a first preferred embodiment of a detector according to the invention.
Figure 18:
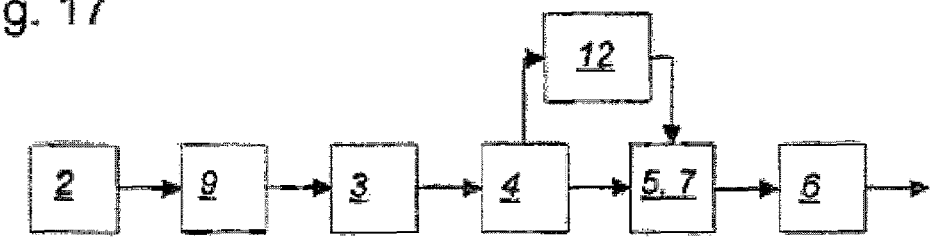
FIG. 18 shows a block diagram of a second preferred embodiment of a detector according to the invention.

Turning now to FIG. 17, there is shown a block diagram of a circuit breaker 11 with break contacts for disconnecting an electric network in a predetermined manner, at least one trigger unit 10 for triggering the break contacts, wherein the circuit breaker includes a detector 1 for detecting aperiodic, substantially step-like changes in the amplitude of at least one electric parameter in the electric network. The trigger unit 10 is operatively connected with the detector 1.

The likelihood of a fire caused by faults in electric networks can thus be reduced. So-called serial and/or parallel faults 18, 19 which can lead to arcing, can thus be recognized in an electric network and the respective network can be disconnected. Fires which may be produced by arcing can thus be reliably prevented. Living beings and installations can thus be protected from the hazards of electric current and resulting fires.

Circuit breakers 11 according to the invention are provided to protect against the effects from any type of fault which cause aperiodic, substantially step-like changes in the amplitude of at least one electric parameter in the electric network. Advantageously, the at least one electric parameter relates to an electric voltage or an electric current. The at least one electric parameter may also relate to electric power. An electric network is preferably any type of electric circuit for the distribution of electric energy, especially in the field of domestic and communal power distribution.

Two frequently occurring faults, generally known as serial faults 18 or parallel faults 19 and schematically illustrated in FIGS. 1 and 2, are known to cause such aperiodic, substantially step-like changes in the amplitude of the electric current or the electric voltage. A serial fault 18 can be caused by a contact problem, e.g. through a dry solder joint or material fatigue. The current flow in the electric line is then interrupted in aperiodic intervals, causing arcing during each interruption and resumption of the current flow. Arcing may potentially cause a fire. With a parallel fault 19, a current flows between two parallel conductors, e.g. due to fatigue of the insulation between two conductors. Higher or lower currents can thus be produced in addition to the already flowing currents depending on the contact resistance. FIG. 3 illustrates the occurrence of a combined parallel and serial fault 18, 19 in a device, which in this example is a triple current distributor.

The faults described above cause substantially step-like changes especially in the current or the voltage occur in the electric network, resulting in substantially step-like changes, decreases or increases in the current or voltage. Substantially step-like changes in the amplitude of an electric parameter in the electric network shall be understood as referring to a severe and rapid increase and/or decrease in the amplitude over a short period of time. The increase and/or decrease of an electric parameter per unit of time is generally referred to as the slew rate. A change of a voltage with a slew rate larger than 1500 V/μs or a change of a current with a slew rate of larger than 100 mA/ns shall be understood in the context of the present invention as representing a substantially step-like change in the amplitude of at least one electric parameter in the electric network.

A circuit breaker 11 according to the invention may include any type of detector 1 capable of detecting aperiodic, substantially step-like changes in the amplitude of at least one electric parameter in the electric network. The detector 1 can be operatively connected with the trigger unit 10. The detector 1 may be an integral part of the circuit breaker 11 or may be inserted in a removable manner in the circuit breaker 11 or be flanged onto the same.

In an advantageous embodiment, the circuit breaker 11 includes a detector 1 according to one of the embodiments of a detector 1 of the invention described below and configured to detect aperiodic, substantially step-like changes in the amplitude of at least one electric parameter in the electric network. Such a detector 1 according to the invention can also be arranged as a structurally independent unit and can be arranged in or near an electric network.

FIGS. 17 to 20 each show a functional block diagram of a preferred embodiment of a detector 1, especially for the circuit breaker 11, with a sensor 2 for faithfully recording the temporal progression of at least one electric parameter, wherein the detector 1 is configured to detect aperiodic, substantially step-like changes in the amplitude of at least one electric parameter, especially current and/or the voltage, in an electric network, preferably according to one of the methods described below.

Such a detector 1 has the advantages and effects described above in the description of the circuit breaker 11 according to the invention.

Detectors 1 according to the invention include a sensor 2 for faithfully recording a temporal progression of at least one electric parameter. Such a sensor 2 is advantageously includes a sum-current transformer, a current transformer, a Foerster probe, a Hall generator, a shunt resistor, a voltmeter and the like. Two or more sensors 2 may also be combined. Advantageously, each conductor may be associated with a separate sensor 2 which records or detects the changes in the electric parameter.

In one embodiment of a detector 1 according to the invention illustrated in FIGS. 17 to 20, one output of the at least one sensor 2 is connected to an input of a first unit 3 for forming a function representing the mathematical sign, another output of the first unit 3 is connected to an input of a flank detector 4, one output of the flank detector 4 is connected to an input of a second unit 5 for determining a pulse-duty factor of a rectangular function, and an output of the second unit 5 is connected to an input of an output unit 6.

The first unit 3 for forming a mathematical sign is preferably arranged as an overmodulating operational amplifier. Flank detectors 4 are known for example from radio engineering, e.g. for decoding a Manchester code, and may be employed in each implementation of a detector 1 according to the invention.

The second unit 5 for determining a pulse-duty factor of a rectangular function is preferably implemented as a filter arrangement 7, especially as a band-pass filter and/or comb filter, and/or as a transformation unit 8. The use and operation of the second units 5 implemented in this manner and their individual advantages are described in more detail in the description of the method according to the invention. The output unit 6 is preferably configured for triggering a trigger unit 10 of a switching device, especially a circuit breaker 11, and therefore includes the respective electric and/or mechanical outputs suitable for triggering a trigger unit 10 of a switching device. The housing of many switching devices has an opening through which the trigger unit 10 of a switching device can be actuated with, for example, a pin. The output unit 6 may therefore include a pin. The output unit 6 can also be configured for charging the energy storage circuit of a conventional residual-current circuit breaker. As illustrated in FIGS. 17 to 20, a detector 1 according to the invention may include a data conditioning unit 9 which conditions the first parameter signal 15 generated by the sensor 2 for further processing, preferably by amplifying the first parameter signal 15 or by transforming a current signal into a voltage signal.

Individual or all components of a detector 1 according to the invention may be constructed or implemented as discrete hardware components. However, individual or all components of a detector 1 according to the invention may also be implemented in hardware and/or software in an integrated circuit, e.g. in a digital signal processor (DSP), a microcontroller (µC), a microprocessor (µP), programmable logic device (PLD) and/or a field programmable gate array (FPGA).

The invention further relates to a method for detecting aperiodic, substantially step-like changes in the amplitude of at least one electric parameter, especially the current and/or the voltage, in an electric network, with a temporal progression of the at least one electric parameter being recorded in a manner substantially faithful to the signal. A first parameter signal 15 is then formed by: (claim 7).

This method has the advantages and effects described above in connection with the description of the circuit breaker according to the invention.

FIGS. 3 to 6 illustrate the application of the method according to the invention to a first parameter signal 15 generated as a result of a periodic, substantially step-like change in the amplitude of at least one electric parameter, for example by phase-angle control. FIG. 3 shows the measured first parameter signal 15. FIG. 4 shows both the first parameter signal 15 and the first rectangular signal 16 formed after the first step of the method. In a first step, the so-called sign or mathematical sign function is applied to the first parameter signal 15. The first method step can be applied to the positive component, the negative component, or both components of the first parameter signal 15.

Figure 5:
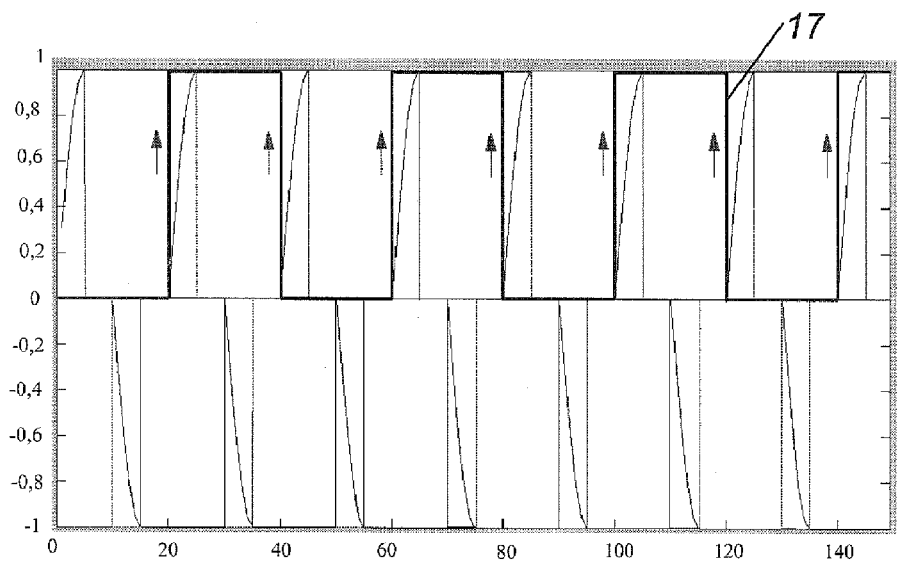
FIG. 5 shows the parameter signal according to FIG. 4 after the second step of the inventive method in the time domain.

In the second method step illustrated in FIG. 5, the flanks of the first rectangular signal 16 are detected, and a second rectangular signal 17 with a predetermined amplitude is formed from the rising flanks. A rising and falling flank in the second rectangular signal 17 follows the rising flanks of the first rectangular signal 16 in an alternating fashion. The second method step is performed for the positive or negative components of the first parameter signal 16.

In the following third method step, the pulse-duty factor of the second rectangular signal 17 is determined. The pulse-duty factor is also known as duty cycle, and can be illustrated and expressed in different ways. The pulse-duty factor of 1:1 in this embodiment is also expressed in the technical literature as 0.5 or with 50%, and designates a so-called symmetrical rectangular signal, as shown in the example of FIG. 5, where the off-time is equal to the on-time.

Three different approaches for determining the pulse-duty ratio are proposed in the method according to the invention, each of which offers advantages depending on the manner in which the method is implemented.

Figure 6:
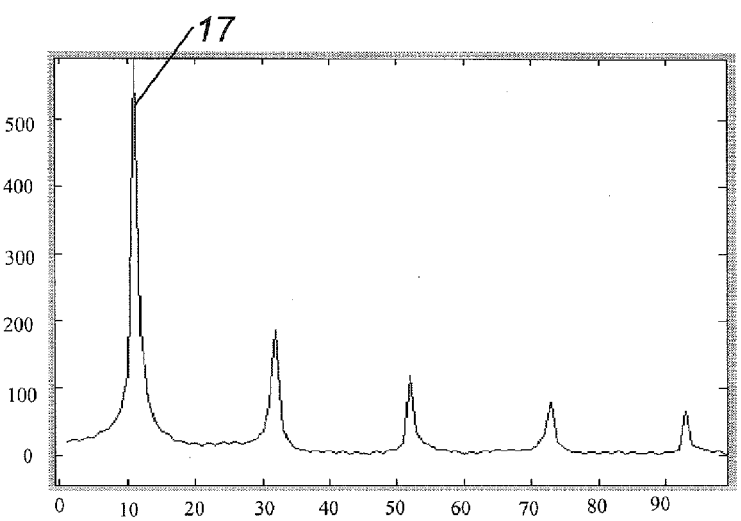
FIG. 6 shows the signal according to FIG. 5 in the frequency domain.
Figure 7:
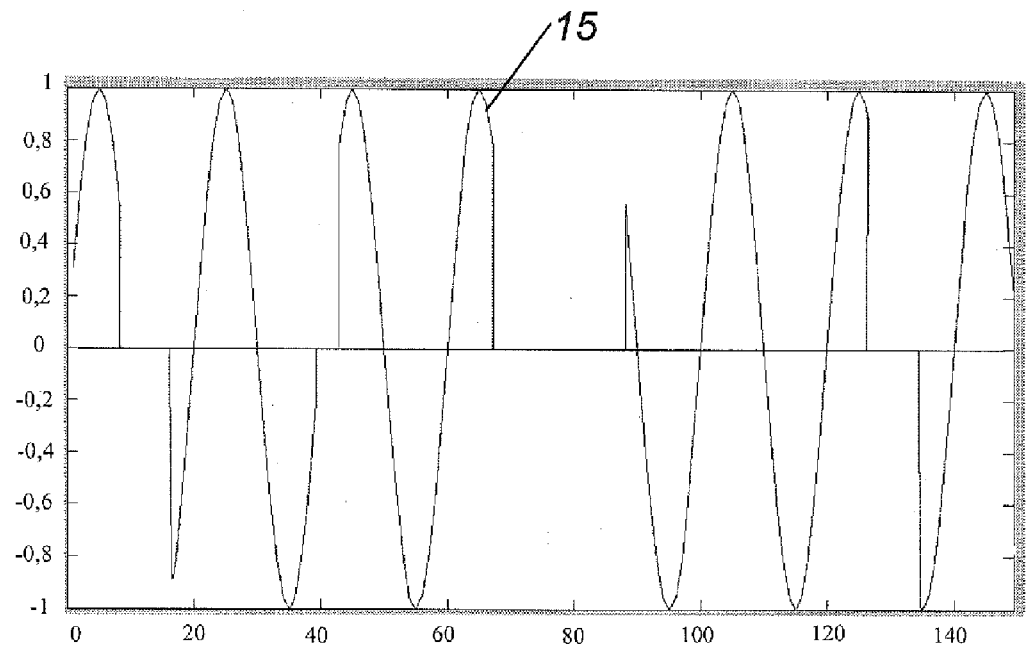
FIG. 7 shows a second example of a first parameter signal (current signal) with aperiodic step-like changes of the amplitude of an electric parameter as a result of a serial fault in the time domain.
Figure 8:
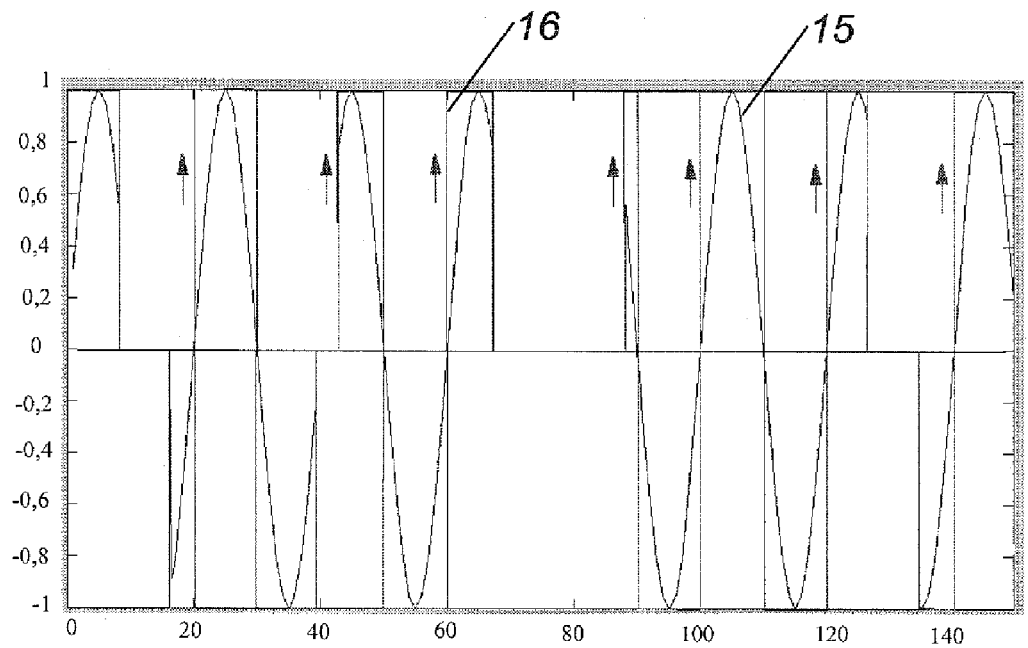
FIG. 8 shows the parameter signal according to FIG. 7 after a first step of the inventive method in the time domain.
Figure 9:
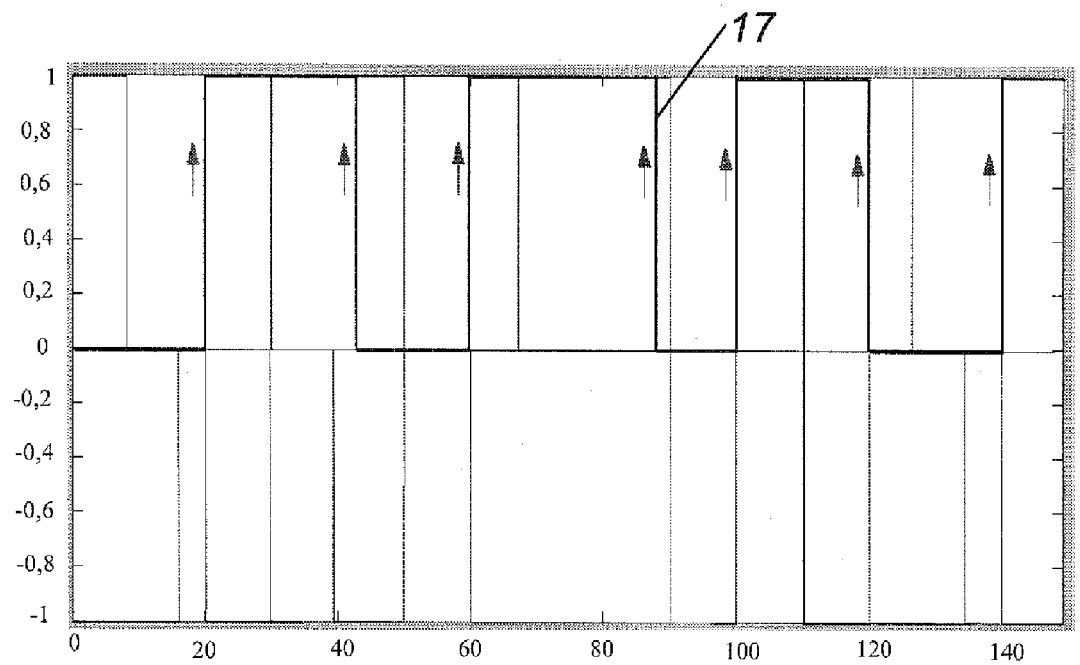
FIG. 9 shows the parameter signal according to FIG. 8 after a second step of the inventive method in the time domain.
Figure 10:
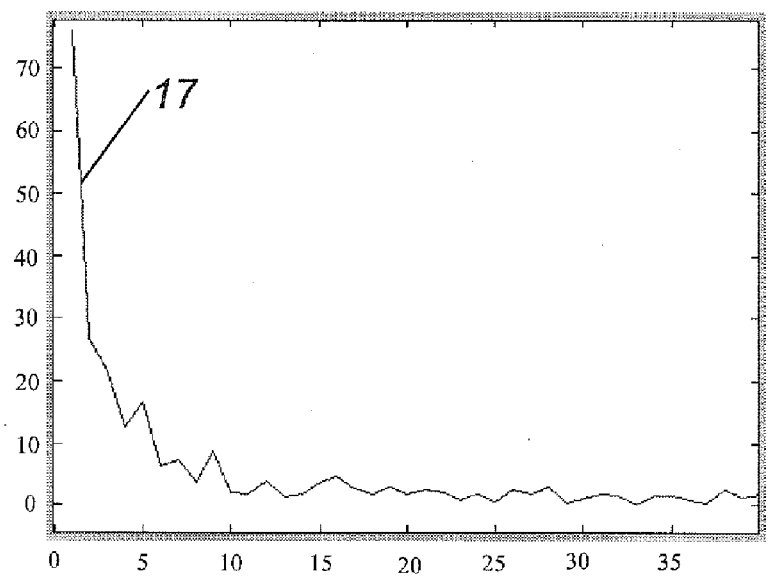
FIG. 10 shows the signal according to FIG. 9 in the frequency domain.

The third method step can be implemented in different ways. For example, the pulse-duty factor of the second rectangular signal 17 can be determined by checking the second rectangular signal 17 for a predetermined fraction of even-numbered harmonics of a fundamental frequency. If the second rectangular signal 17 is a symmetric rectangular signal, it only has harmonics with frequencies representing an odd multiple of the fundamental frequency. Such a second rectangular signal 17 therefore results from a periodic, substantially step-like change in the amplitude, which is caused in an intentional change of electric parameters not related to a fault. FIG. 6 shows the exemplary second rectangular signal 17 in the frequency domain. Conversely, an aperiodic, substantially step-like change in the amplitude results from a fault occurring at irregular intervals and is expressed by a fraction of harmonics having frequencies that are even multiples of the fundamental frequency.

Figure 19:
FIG. 19 shows a block diagram of a third preferred embodiment of a detector according to the invention.
Figure 20:
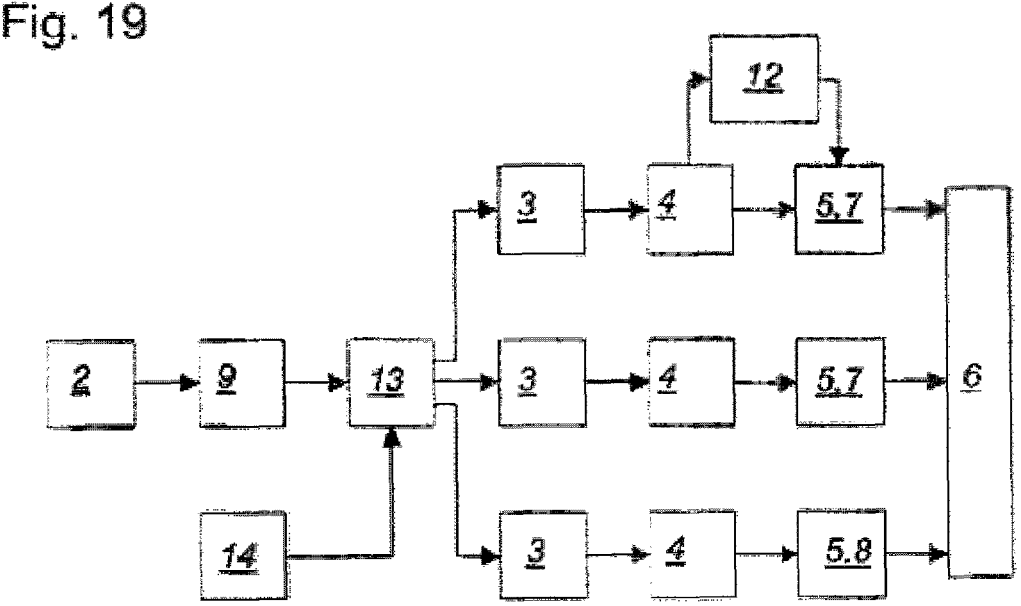
FIG. 20 shows a block diagram of a fourth preferred embodiment of a detector according to the invention.

In a first advantageous embodiment of the third method step, the second rectangular signal 17 is transformed from the time domain into an image domain, preferably the frequency domain, whereafter the even-numbered harmonics of the fundamental frequency are determined. The fundamental frequency and its even-numbered harmonics can be quickly and accurately determined using a Fast-Fourier-Transform (FFT), for example by using a processor in the detector 1. An exemplary arrangement of a detector 1 is illustrated in FIG. 19 or 20.

In the first embodiment of the third method step, the second rectangular signal 17 is filtered by a filter arrangement 7, in particular a band-pass filter or comb filter, whereafter the even-numbered harmonics of the fundamental frequency are determined. The detector 1 may be a discrete component, but may also be implemented in an IC. An exemplary detector 1 with such configuration is shown in FIG. 17. Since a filter arrangement 7 for determining harmonics must be tuned to the fundamental frequency, the filter constants of the filter arrangement 7 of this embodiment are adapted to a frequency determined for the fundamental frequency. For this purpose, a third unit 12 can be provided for adjusting the filter coefficients, e.g. in the embodiment illustrated in FIG. 18. The frequency of the fundamental frequency can be determined approximately in the area of the flank detector 4, for example by counting the flanks of the first rectangular signal 16.

In a third embodiment of the third method step, a signal with half the magnitude of a third value is added to or subtracted from the second rectangular signal, forming a third rectangular signal, wherein the third rectangular signal subsequently checked for being free of an offset. In this respect, an attempt is made to symmetrize the second rectangular signal 17 with respect to its positive and negative signal components, which can only be achieved if the second rectangular signal has a symmetric pulse-duty factor or duty cycle. If the second rectangular signal 17 has a different pulse-duty factor, it inevitably has an offset and hence a DC voltage component. When such an offset or DC voltage component is detected, it can be concluded that an aperiodic, substantially step-like change is detected in the amplitude of at least one electric parameter.

In a fourth method step, an aperiodic, substantially step-like change of the amplitude of at least one electric parameter is conclusively identified if the first pulse-duty factor deviates from a pulse-duty factor of 1:1. In this case, either a message is transmitted to a control system or a user, or a trigger unit 10 of a switching device is triggered.

FIGS. 7 to 10 illustrate the aforedescribed individual method steps for a first parameter signal 15 which has an aperiodic, substantially step-like change in an electric parameter caused by a serial fault 18. The various weak harmonics having approximately identical magnitudes are clearly visible in FIG. 10. Even-numbered harmonics can be seen in addition to the odd-numbered harmonics.

Figure 11:
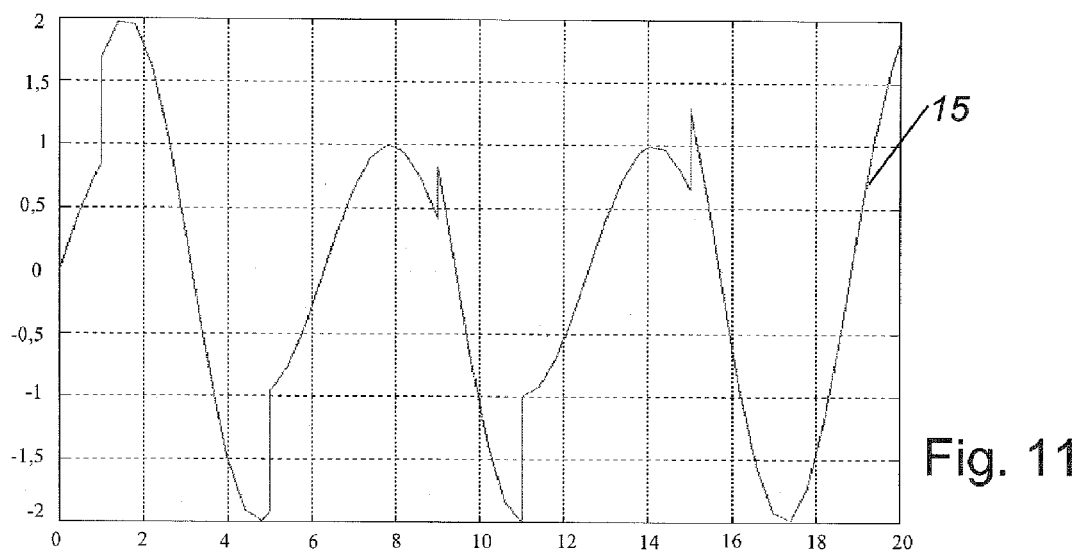
FIG. 11 shows a third example of a first parameter signal (current signal) with aperiodic step-like changes of the amplitude of an electric parameter as a result of a parallel fault in the time domain.
Figure 12:
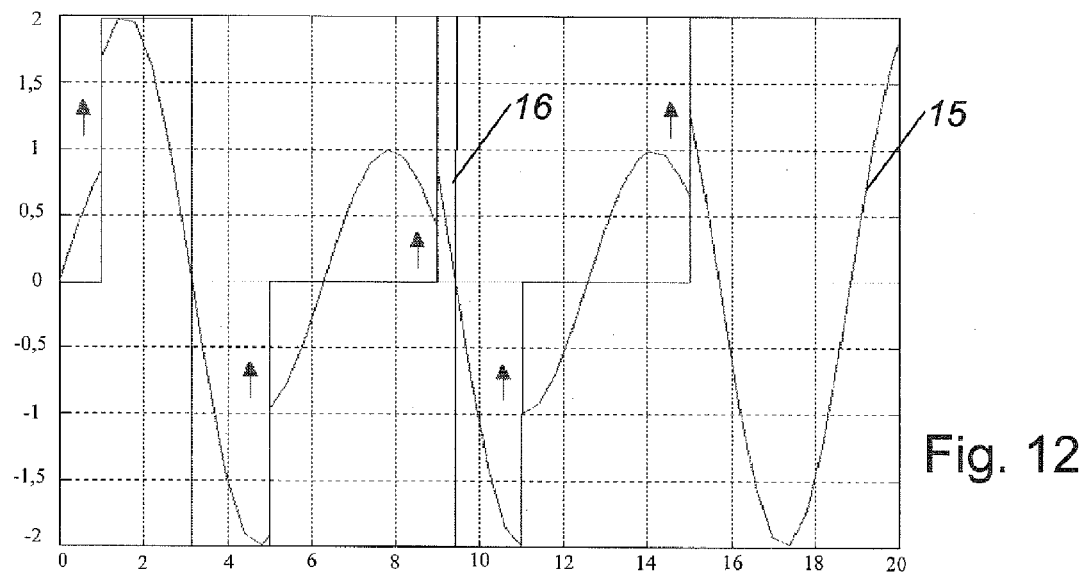
FIG. 12 shows the parameter signal according to FIG. 11 according to an advantageous embodiment of the first step of the inventive method in the time domain.
Figure 13:
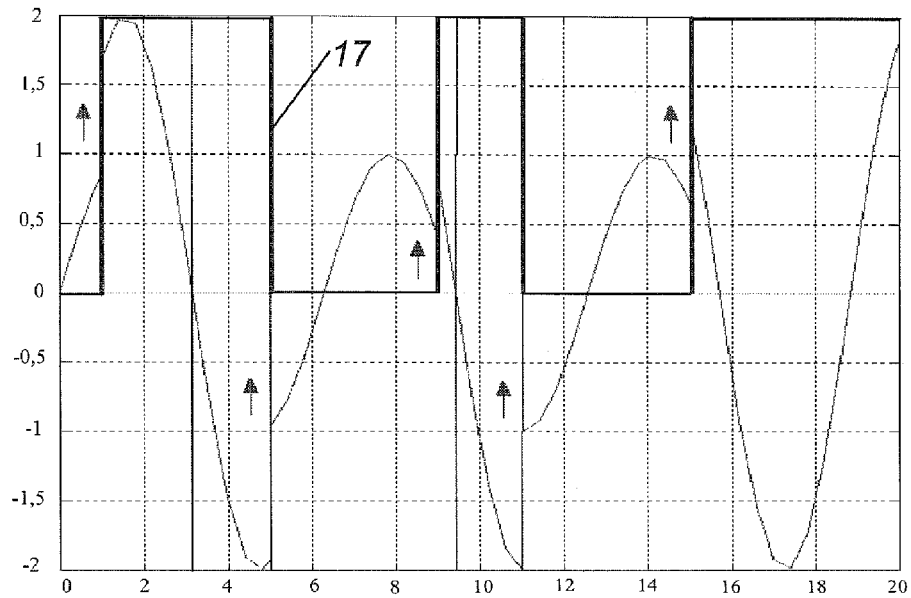
FIG. 13 shows the parameter signal according to FIG. 12 after the second step of the inventive method in the time domain.
Figure 14:
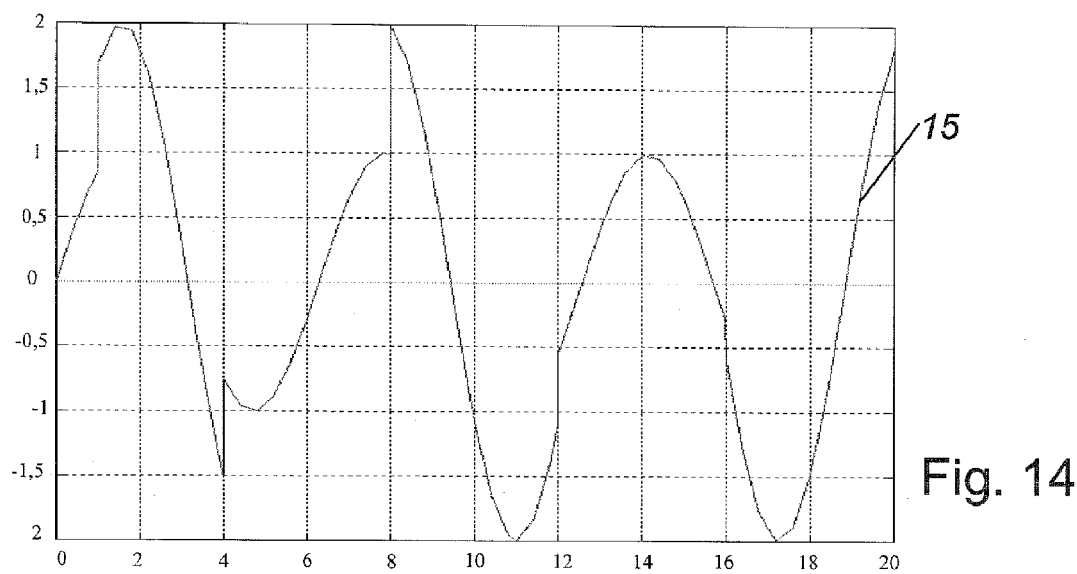
FIG. 14 shows a fourth example of a first parameter signal (current signal) with periodic step-like changes of the amplitude of an electric parameter as a result of a parallel fault in the time domain.
Figure 15:
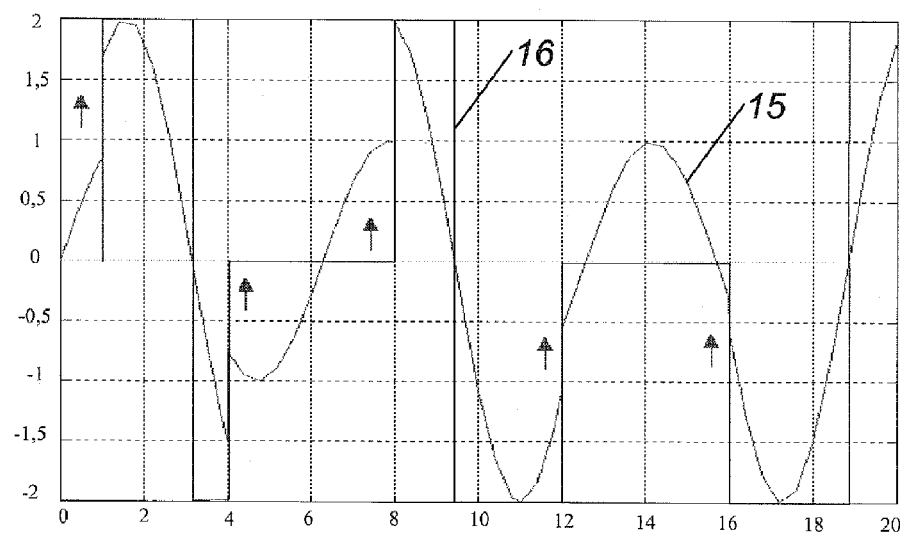
FIG. 15 shows the parameter signal according to FIG. 14 according to an advantageous embodiment of the first step of the inventive method in the time domain.
Figure 16:
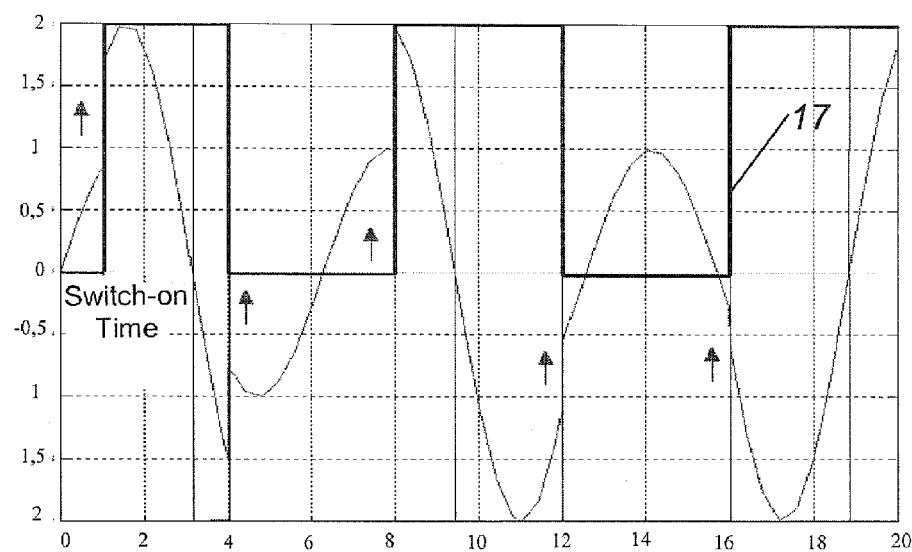
FIG. 16 shows the parameter signal according to FIG. 15 after the second step of the inventive method in the time domain.

With so-called parallel faults 19, an additional signal, such as a current, may be superimposed on the undisturbed parameter signal. FIGS. 11 to 13 illustrate the first parameter signal as well as the first and second rectangular signals of an aperiodically disturbed first parameter signal 15, with the substantially step-like changes of the first parameter signal 15 clearly visible. FIGS. 14 to 16 illustrate the first parameter signal 15 as well as the first and second rectangular signals 16, 17 of a periodically disturbed first parameter signal 15, with the substantially step-like changes of the first parameter signal 15 clearly visible.

In the first method step, a flank may be detected in addition to the only the mathematical sign function. The mathematical sign function is therefore not applied to all components of the first parameter signal 15, but only to the regions of greater amplitude. Accordingly, in the first step, the first value is assigned to positive components of the first parameter signal 15 and the second value is assigned to negative components of the first parameter signal 15 between two temporally consecutive, substantially step-like changes with greater amplitude than the first parameter signal 15 before the substantially step-like change took place. The first rectangular signal 16 formed in this manner is then further processed and evaluated as described above.

Advantageously, the two previously described embodiments of the first method step may be carried out in parallel.

Advantageously, to recognize switch-on processes, a first parameter signal 15, in particular a temporally non-periodic signal, may be intermediately stored for a predetermined period of time.

Moreover, different embodiments of the aforedescribed method or different embodiments of the described detector 1 may be operated in parallel, for example to evaluate more complex first parameter signals 15 which are composed of a plurality of individual signals with different amplitudes. FIG. 20 shows a block diagram of such an arrangement, wherein a fourth unit is provided for level separation and a fifth unit is provided for assigning the flanks to different amplitudes. The illustrated embodiment includes differently configured second units for determining a pulse-duty factor; however, these units may also be configured to be identical.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for detecting aperiodic, substantially step-like changes in amplitude of at least one electric parameter, especially the current and/or the voltage, in an electric network, comprising the steps of:
  measuring a temporal progression of the at least one electric parameter and forming a first parameter signal faithfully representing the temporal progression;
  assigning for a duration of the first parameter signal a predetermined constant positive first value to each positive component of the first parameter signal and assigning a predetermined constant negative second value to each negative component of the first parameter signal, and forming a first rectangular signal;
  detecting rising or falling flanks of the first rectangular signal and assigning a predetermined constant third value unequal zero to regions between two consecutive rising flanks or two consecutive falling flanks, and assigning a value of zero to regions disposed between a rising flank and a falling flank, forming a second rectangular signal;

determining a first pulse-duty factor of the second rectangular signal;
comparing the first pulse-duty factor with a pulse-duty factor of 1:1; and
signaling detection of an aperiodic, substantially step-like change in the amplitude of the at least one electric parameter if the first pulse-duty factor is different from the pulse-duty factor of 1:1.

2. The method of claim 1, wherein the predetermined constant positive first value and the predetermined constant negative second value are assigned to two temporally consecutive, substantially step-like changes which have greater amplitude than the first parameter signal before the substantially step-like change.

3. The method of claim 1, wherein the first value and the second value are of identical magnitude.

4. The method of claim 1, further comprising the steps of:
transforming the second rectangular signal from a time domain into an image domain, and
determining even-numbered harmonics of the fundamental frequency.

5. The method of claim 4, wherein the image domain is a frequency domain.

6. The method of claim 4, wherein the first pulse-duty factor of the second rectangular signal is determined from a predetermined fraction of even-numbered harmonics of a fundamental frequency.

7. The method of claim 1, further comprising the steps of:
filtering the second rectangular signal with a filter arrangement, and
determining even-numbered harmonics of the fundamental frequency.

8. The method according to claim 7, wherein filter constants of the filter arrangement are matched to the fundamental frequency.

9. The method according to claim 7, wherein the filter arrangement comprises a band-pass filter or a comb filter, or both.

10. The method of claim 1, further comprising the steps of:
adding to or subtracting from the second rectangular signal a signal having half a magnitude of the third value to form a third rectangular signal, and
determining absence of an offset in the third rectangular signal.

11. The method of claim 1, further comprising the step of intermediately storing the first parameter signal for a predetermined time period.

12. The method according to claim 11, wherein the first parameter signal is a temporally non-periodic signal.

13. A detector for detecting aperiodic, substantially step-like changes in amplitude of at least one electric parameter, especially the current and/or the voltage, in an electric network, comprising:
a sensor configured to measure a temporal progression of at least one electric parameter;
a first unit having an input connected to the sensor and receiving a signal from the sensor, and an output supplying a mathematical sign function;
a flank detector having an input connected to the output of the first unit and determining a flank of the mathematical sign function as output signal;
a second unit having an input receiving the output signal from the flank detector and determining a pulse-duty factor of a rectangular function; and
an output unit connected to an output of the second unit.

14. The detector of claim 13, wherein the second unit comprises a filter arrangement.

15. The detector of claim 14, wherein the filter arrangement comprises at least one of a band-pass filter and a comb filter.

16. The detector of claim 13, wherein the second unit comprises a transformation unit.

17. The detector of claim 13, wherein the output unit is configured for triggering a trigger unit of a switching device.

18. The detector of claim 17, wherein the switching device is a circuit breaker.

19. A detector for detecting aperiodic, substantially step-like changes in amplitude of at least one electric parameter, especially the current and/or the voltage, in an electric network, comprising:
a sensor configured to measure a temporal progression of at least one electric parameter,
a first unit having an input connected to the sensor and receiving a signal from the sensor, said first unit configured to form a first parameter signal faithfully representing the temporal progression to assign for a duration of the first parameter signal a predetermined constant positive first value to each positive component of the first parameter signal and to assign a predetermined constant negative second value to each negative component of the first parameter signal, and an output supplying a first rectangular signal,
a flank detector having an input connected to the output of the first unit and receiving the first rectangular signal, said flank detector configured to detect rising or falling flanks of the first rectangular signal and assign a predetermined constant third value unequal zero to regions between two consecutive rising flanks or two consecutive falling flanks, and to assign a value of zero to regions disposed between a rising flank and a falling flank, and an output supplying a second rectangular signal,
a second unit having an input receiving the output signal from the flank detector and configured to determine a first pulse-duty factor of the second rectangular function and to compare the first pulse-duty factor with a pulse-duty factor of 1:1; and
an output unit connected to an output of the second unit and configured to signal detection of an aperiodic, substantially step-like change in the amplitude of the at least one electric parameter if the first pulse-duty factor is different from the pulse-duty factor of 1:1.

20. A circuit breaker, comprising:
a break contacts for disconnecting an electric network,
at least one trigger unit configured to trigger the break contact, and
a detector having
a sensor configured to measure a temporal progression of at least one electric parameter,
a first unit having an input connected to the sensor and receiving a signal from the sensor, said first unit configured to form a first parameter signal faithfully representing the temporal progression to assign for a duration of the first parameter signal a predetermined constant positive first value to each positive component of the first parameter signal and to assign a predetermined constant negative second value to each negative component of the first parameter signal, and an output supplying a first rectangular signal,
a flank detector having an input connected to the output of the first unit and receiving the first rectangular signal, said flank detector configured to detect rising or falling flanks of the first rectangular signal and assign a predetermined constant third value unequal zero to regions between two consecutive rising flanks or two consecutive falling flanks, and to assign a value of zero to regions disposed between a rising flank and a falling flank, and an output supplying a second rectangular signal, a second unit having an input receiving the output signal from the flank detector and configured to determine a first pulse-duty factor of the second rectangular function and to compare the first pulse-duty factor with a pulse-duty factor of 1:1; and an output unit connected to an output of the second unit and configured to signal detection of an aperiodic, substantially step-like change in the amplitude of the at least one electric parameter if the first pulse-duty factor is different from the pulse-duty factor of 1:1.

* * * * *